US008888063B2

(12) United States Patent
Mack et al.

(10) Patent No.: US 8,888,063 B2
(45) Date of Patent: Nov. 18, 2014

(54) INTEGRATED MAGNETIC TABLET STAND

(71) Applicant: Qwest Communications International Inc., Denver, CO (US)

(72) Inventors: Adam Mack, Menlo Park, CA (US); James Yurchenco, Palo Alto, CA (US); Matthew Robert Adams, Mountain View, CA (US); Andrew Switky, Menlo Park, CA (US); Adam Vollmer, San Francisco, CA (US); Michael Gibson, Evergreen, CO (US)

(73) Assignee: Qwest Communications International Inc., Denver, CO (US)

( * ) Notice: Subject to any disclaimer, the term of this patent is extended or adjusted under 35 U.S.C. 154(b) by 42 days.

(21) Appl. No.: 13/722,893

(22) Filed: Dec. 20, 2012

(65) Prior Publication Data

US 2013/0163197 A1    Jun. 27, 2013

Related U.S. Application Data

(60) Provisional application No. 61/579,875, filed on Dec. 23, 2011.

(51) Int. Cl.
*A47G 1/24* (2006.01)
*F16M 11/00* (2006.01)
*F16M 13/00* (2006.01)
*G06F 1/16* (2006.01)
*F16M 11/10* (2006.01)

(52) U.S. Cl.
CPC ............. *F16M 11/00* (2013.01); *F16M 13/005* (2013.01); *G06F 1/166* (2013.01); *G06F 1/1633* (2013.01); *G06F 1/1626* (2013.01); *F16M 11/10* (2013.01); *Y10S 248/919* (2013.01)

USPC ........ 248/454; 248/444.1; 248/447; 248/121; 248/919

(58) Field of Classification Search
USPC ................ 248/454, 444.1, 44, 447, 455, 458, 248/465.1, 683, 121, 126, 127, 371, 917, 248/919, 923, 687; 361/679.59, 679.22, 361/679.26, 679.3, 679.55, 679.56
See application file for complete search history.

(56) References Cited

U.S. PATENT DOCUMENTS

| 3,376,009 | A | * | 4/1968 | Domino ..................... 248/456 |
| 3,908,955 | A | * | 9/1975 | Frechtman ................ 248/470 |
| 5,915,661 | A | * | 6/1999 | Silverman et al. ......... 248/465.1 |
| 6,651,943 | B2 | * | 11/2003 | Cho et al. .................. 248/122.1 |
| 6,899,311 | B1 | * | 5/2005 | Ternus ....................... 248/454 |
| 7,762,515 | B2 | * | 7/2010 | Lin ............................ 248/447 |
| 7,937,810 | B2 | * | 5/2011 | Hu ............................. 16/241 |
| 8,400,767 | B2 | * | 3/2013 | Yeom et al. ............. 361/679.59 |
| 2004/0173725 | A1 | * | 9/2004 | Rodriguez Villanueva .. 248/454 |
| 2005/0269479 | A1 | * | 12/2005 | Yeh et al. ..................... 248/457 |
| 2007/0075208 | A1 | * | 4/2007 | Chen ........................... 248/455 |

(Continued)

*Primary Examiner* — Terrell McKinnon
*Assistant Examiner* — Monica Millner
(74) *Attorney, Agent, or Firm* — Swanson & Bratschun, L.L.C.

(57) ABSTRACT

Novel stands for tablet computers and other electronic devices. A stand for a tablet may comprise a body having one or more attachment mechanisms at one location and a crossbar at a second location. The crossbar may comprise a portion of a first material disposed to magnetically interact with a portion of a second material that is provided by the tablet. The magnetic interaction may cause the crossbar to serve as one or more detents that movably affixes the stand in a desired position relative to the tablet.

9 Claims, 8 Drawing Sheets

(56) References Cited

U.S. PATENT DOCUMENTS

| | | | |
|---|---|---|---|
| 2010/0012812 A1* | 1/2010 | Hu | 248/454 |
| 2011/0276885 A1 | 11/2011 | Gibson et al. | |
| 2012/0160973 A1* | 6/2012 | Du et al. | 248/121 |
| 2013/0092811 A1* | 4/2013 | Funk et al. | 248/371 |

* cited by examiner

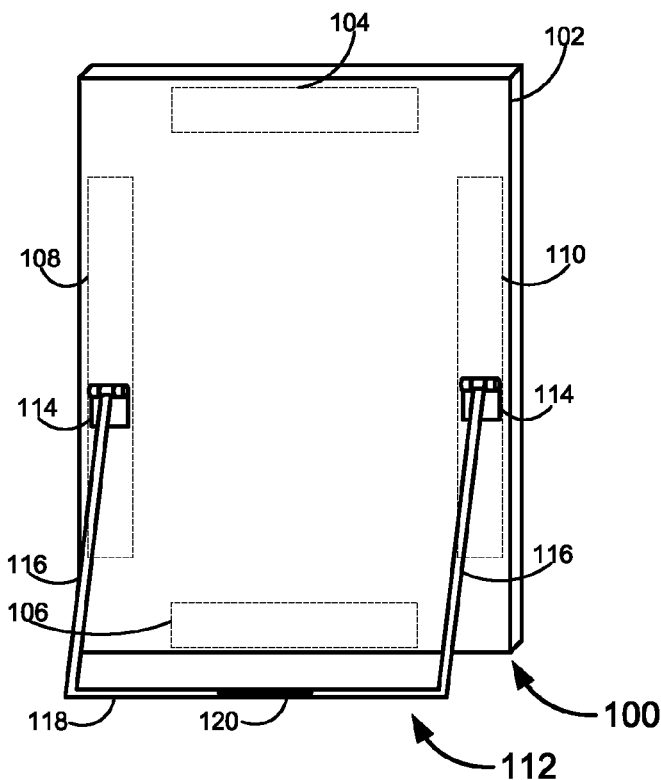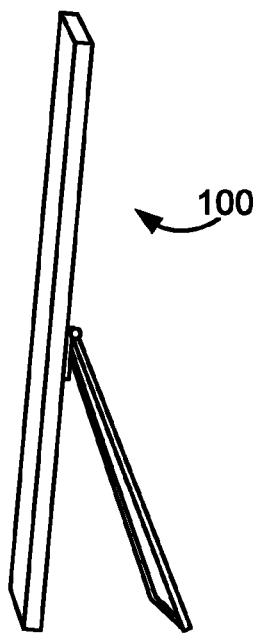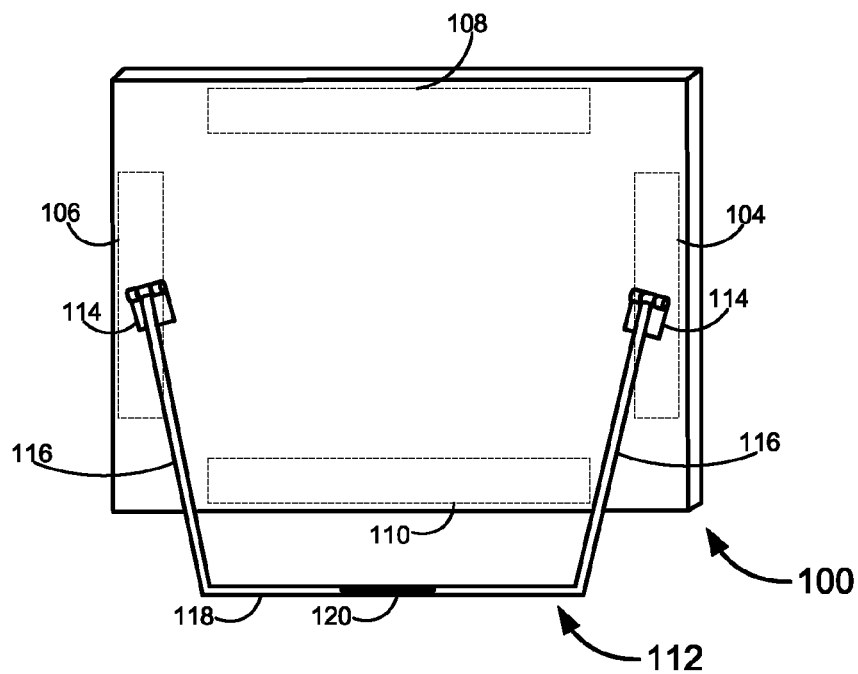
FIG. 1A
FIG. 1B
FIG. 1C

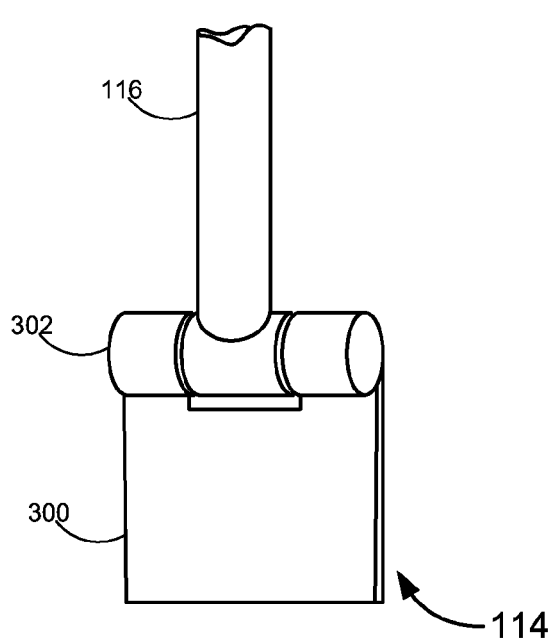
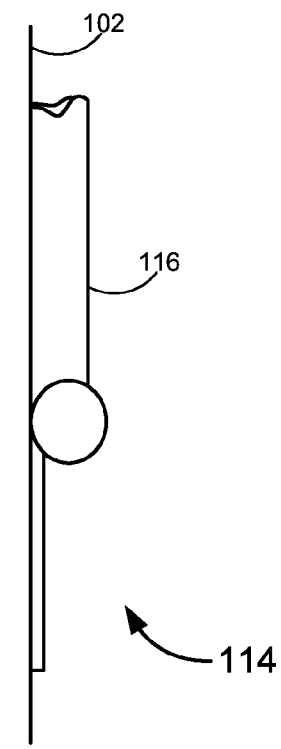
FIG. 3A    FIG. 3B
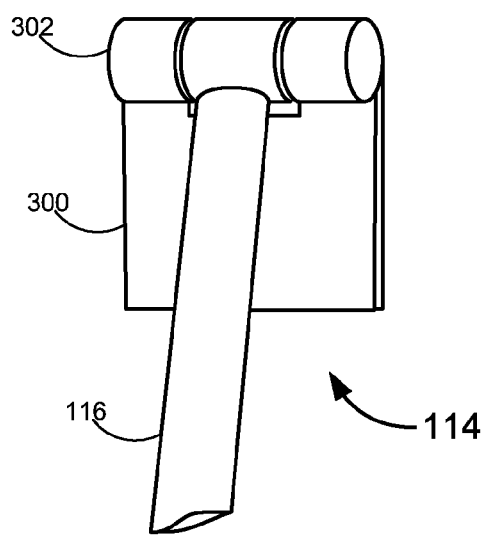
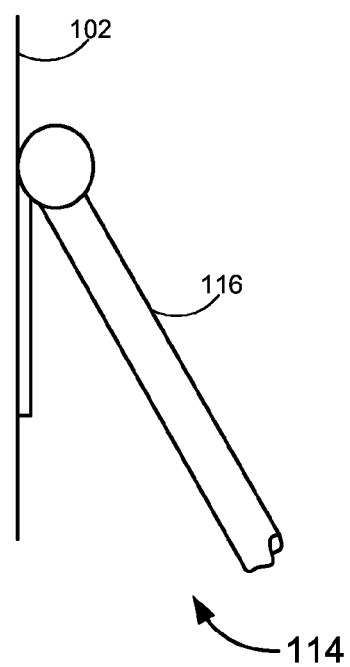
FIG. 3C    FIG. 3D

INTEGRATED MAGNETIC TABLET STAND

CROSS-REFERENCES TO RELATED APPLICATIONS

This application claims the benefit, under 35 U.S.C. §119 (e), from provisional U.S. Patent Application No. 61/579,875 filed Dec. 23, 2011 by Mack et al. and titled, "Integrated Magnetic Tablet Stand" which is hereby incorporated by reference, as if set forth in full in this document, for all purposes.

The present disclosure may also be related to the following commonly assigned applications/patents:

U.S. patent application Ser. No. 12/773,742, filed May 4, 2010 by Gibson et al. and titled, "Multi-Client Local Network Base Station" (published as US PG Pub. No. 20110276885 A1 on Nov. 10, 2011) (hereinafter, the "'742 Application"), which is incorporated herein by reference in its entirety.

The respective disclosures of these applications/patents are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to electronic devices, and more particularly, to a method and system for mounting a tablet computer.

BACKGROUND

Tablet computers represent an ever-increasing segment of the consumer electronics industry. In a general sense, a tablet computer is a computer system that has a relatively flat configuration, with one of the surfaces largely comprising a screen. Typically, the screen is a touch screen operated by fingertip and/or digital stylus. As a complete and stand-alone computer that does not require an external mouse or keyboard, a tablet can serve as a minimal, lightweight device that can allow users to access the Internet, music, and other personal files on-the-go. The tablet computer has become significantly popular among users around the world, as a result of its mobility and versatility.

A challenge with the minimalist design of the tablet computer is mounting the tablet in a usable position on a surface (such as a counter or desk). The back of the tablet is typically a flat rear housing without means to prop the tablet in an upright position. Upright positions may be preferred during usage, for instance, while viewing multimedia, video chatting, or gaming. In order to maintain an upright position, the tablet would need to rest against a wall or other vertically disposed feature, which may not be available in the user's surroundings. In most cases, such set-ups are precarious, and the device may slip and fall over.

Methods exist for affixing the tablet computer in various upright positions. For instance, existing tablet protector covers may provide one end for securing the tablet to the cover, and a second end for holding the tablet in an upright position, such as grooves for propping up the covered tablet, and/or various folding configurations for the cover to support an upright tablet. However, tablet covers may be aesthetically displeasing or flimsy. Other tablet stands may require additional mechanical assemblies, be difficult to mount or bulky accessories which hinder the portability of the tablet.

The embodiments of the present disclosure are intended to overcome some of the above concerns, and to provide related advantages.

BRIEF SUMMARY

Various embodiments provide stands for tablet computers and similar devices, as well as methods of using and/or manufacturing such stands. Merely by way of example, one embodiment provides a stand for a tablet computing system, in which a body portion of the stand provides an attachment mechanism at a first location, and a crossbar at a second location. One or more portions of a first material may be affixed to or incorporated in the crossbar, such that the first material can interact magnetically with one or more portions of a second material that may be incorporated in or affixed to the tablet computing system. Merely by way of example, the first and/or second material might be magnets and/or magnetically attractive materials. Magnetic interactions between the crossbar and the rear housing of the tablet can apply force to the stand (relative the tablet computing system) to serve as one or more detents that movably affix the stand in one or more desired positions relative to the tablet computing system.

In another embodiment, a tablet computing system may comprise a stand having affixed thereto or incorporated within it a first material, and a rear housing having affixed thereto or incorporated within a second material positioned to magnetically interact with the first material of the stand, serving as a first detent to movably affix the stand in a first position.

In another embodiment, a method is provided for positioning a tablet computing system comprising a stand having affixed thereto or incorporated therein a first material and a rear housing having affixed thereto or incorporated therein second material, the second material being positioned to interact magnetically with the first material to serve as a first detent to movably affix the stand in a first position. The method might comprise moving the stand until the second material interacts materially with the first material, movably affixing the stand at the first detent. The method might further comprise placing the tablet computing system on a flat surface, so that the stand serves as a support to maintain the tablet in a generally upright position.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 1A shows one embodiment of a integrated magnetic tablet stand as deployed on a rear housing of a tablet computing system.

FIG. 1B shows a side view of FIG. 1A.

FIG. 1C shows a landscape viewing position of a stand deployed on a tablet.

FIG. 3A shows a closed position of a magnetic attachment mechanism.

FIG. 3B shows a side view of the closed position of FIG. 3A.

FIG. 3C shows an open position of a magnetic attachment mechanism.

FIG. 3D shows a side view of the open position of FIG. 3C.

DETAILED DESCRIPTION OF CERTAIN EMBODIMENTS

Figure 2A:
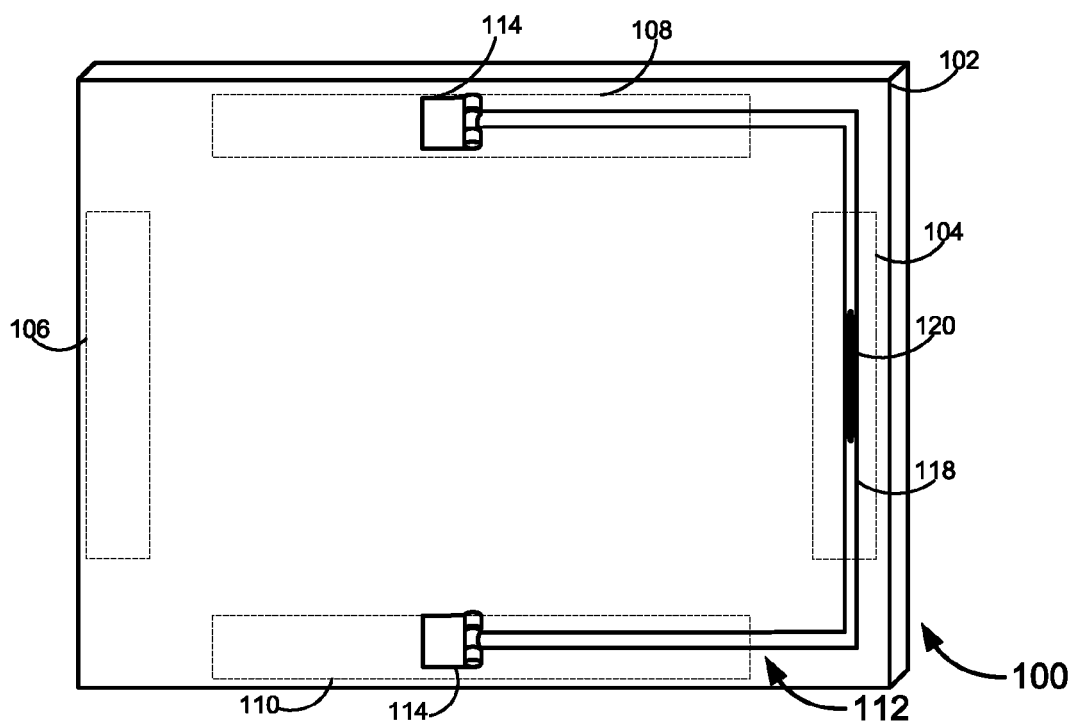
FIG. 2A shows a closed position of an integrated magnetic tablet and stand.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

A set of embodiments disclosed herein provides novel stands for tablet computers and other electronic devices. One embodiment can be employed in a tablet computer, such as an Apple IPAD™ tablet computer, or similar device. Merely by way of example, the '742 Application describes a number of communication systems, including base stations, tablet systems, and handset systems, any (or all) of which can employ various embodiments of the magnetic stands described herein.

FIG. 1A illustrates one embodiment of the integrated magnetic tablet stand as deployed on a rear housing of a tablet computing system ("tablet"). The rear housing 102 may represent a built-in rear cover of the tablet 100, or a removable rear cover that is attached to the back of the tablet 100. The rear housing 102 may provide portions of a second material, such as integrated magnets capable of generating magnetic fields that attract ferromagnetic materials and alloys thereof, such as iron, nickel, cobalt, and steel. Merely by way of example, the rear housing 102 may comprise a top magnet 104, bottom magnet 106, and side magnets 108, 110. The magnets 104, 106, 108, 110 may be configured to attract magnetic components provided in the stand 112, such as a pair of magnetic attachment mechanisms 114 attracted to the side magnets 108, 110 as shown in FIG. 1A. Alternatively, the attachment mechanisms 114 might be adhesive and/or mechanical, such that the attachment mechanisms 114 are permanently attached to the tablet housing 102, in which case magnets 108 and 110 can be omitted. For instance, and merely by way of example, the rear housing 102 may be configured with a pair of axles that hingedly secure the pair of attachment mechanisms 114.

It should be noted that any materials that are magnetically attractive to one another can be employed as the magnets 104-110 described in conjunction with FIG. 1 in the housing 102 and the stand 112, respectively. Merely by way of example, the housing 102 might incorporate (or have attached thereto) portions of one type of material, such as one or more magnets, while the stand incorporates (or has attached thereto) portions of a different material, such as ferromagnetic material, which is magnetically attracted to the magnets. Alternatively, the stand 112 might include magnets, and the housing 102 might include ferromagnetic material. In other cases, both the stand 112 and the housing 102 might include portions of the same material (e.g., magnets) arranged with the relative polarity of the portions providing for attraction between the stand 112 and the housing. Any arrangement in which at least a portion of the stand 112 is magnetically attracted to at least a portion of the housing 102 to experience magnetic force relative the housing sufficient to serve as a detent, as described further herein, will satisfy various embodiments. Hence, while the discussion below provides various examples of configurations of magnets and magnetic materials, those examples should be considered non-limiting, and it should be appreciated that different arrangements that provide similar magnetic attraction characteristics can be substituted within various embodiments.

The pair of attachment mechanisms 114 may be permanently attached to (or incorporated with) a first location on the stand, such as an end portion of a pair of legs 116, whereby the length of each leg 116 may span approximately half of the longer edge of rectangular tablet 100. A second location on the stand, such as a second end portion of the pair of legs 116 may be permanently connected to (and/or might comprise) the ends of a crossbar 118, whereby the length of the crossbar 118 may span approximately the length of the shorter edge of rectangular tablet 100. In one embodiment, the first location is the first end portion of the stand 112, and the second location is the second end portion of the stand 112. The crossbar 118 may further comprise magnetic materials, such as at least one magnet 120. The magnet 120 may be permanently embedded in a portion of the crossbar 118 and configured to interact magnetically with the magnet 106 of the rear housing 102 when in sufficient proximity, thus serving as a magnetic detent that movably affixes the stand 112 and tablet 100 in a substantially upright, portrait viewing position of FIG. 1A. FIG. 1B shows a side view of the upright, portrait viewing position, with the tablet 100 sitting at a comfortably inclined viewing angle.

As shown in FIG. 1C, in one embodiment, the connection between the crossbar 118 and the legs 116 may be flexible, such that the legs 116 may be deflected outward to allow attachment mechanisms 114 to attract to the magnets 104, 106. For instance, the angle between each leg 116 and crossbar 118 of FIG. 1A might be approximately 90 degrees to accommodate the portrait viewing position, whereas the angle is obtuse in FIG. 1C to accommodate a landscape viewing position. In FIG. 1C, magnet 120 may be attracted to magnet 110, thereby serving as a magnetic detent that affixes the stand 112, relative to the tablet 100, in the upright, landscape viewing mode. It is worth noting that while a single magnet 120 is shown, the crossbar 118 may be embedded with additional magnets configured to interact with any or all of the magnets 104, 106, 108, and 110.

Figure 2B:
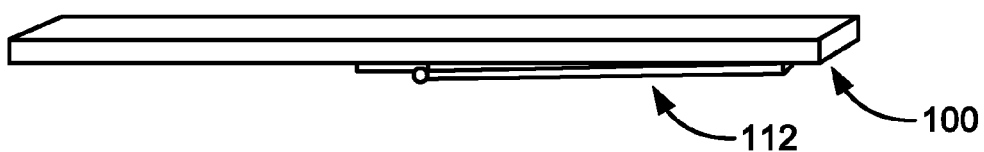
FIG. 2B shows a side view of the closed position of FIG. 2A.

FIG. 2A illustrates a second position of the integrated magnetic tablet stand 112. In the second position, the attachment mechanisms 114 are attracted to magnets 108, 110, and the magnet 120 of the crossbar 118 is attracted to magnet 104, such that the stand 112 is disposed relatively flat against the rear housing 102. The magnetic attractions between the stand 112 and rear housing 102 prevents the legs 116 and crossbar 118 from deploying, for instance, during transportation of the tablet 100. FIG. 2B shows a side view of the second position, whereby the tablet 100 may be lain relatively flat on the stand 112.

FIGS. 3A, 3B, 3C and 3D illustrate one embodiment of the attachment mechanism 114. In the illustrated embodiment, the attachment mechanism 114 comprises a magnetic plate 300 configured to interact with and lay flush against the magnets 104, 106, 108, and/or 110 of the rear housing 102, as shown in FIGS. 1A and 1C. Of course, as mentioned above, the attachment mechanism 114 alternatively might be configured to be permanently attached to the tablet rear housing 102, such that the plate 300 might feature an adhesive surface facing the housing, mechanical fastening apparatus (such as holes for screws or bolts, etc. and/or could be welded or otherwise affixed to the tablet housing).

In the illustrated embodiment, however, the magnetic plate 300 can comprise magnets and/or various magnetic materials, such as those described above, for magnetic interaction with various portions of a tablet rear housing 102, also as described above. One end of the magnetic plate 300 may be permanently attached to a hinge 302 that connects the magnetic plate 300 to leg 116, so that leg 116 is free to rotate about the hinge 302 when the attachment mechanism 114 is deployed on a magnet of the rear housing 102. FIG. 3A illustrates an "up" or "closed" position of the magnetic attachment mechanism 114, whereby the leg 116 may be disposed relatively flat against the rear housing 102, as illustrated in the side view of FIG. 3B. The closed position may correspond to the second position that is shown in FIGS. 2A and 2B.

FIG. 3C illustrates a "down" or "open" position of the magnetic attachment mechanism 114. The leg 116 is rotated downward about the hinge 302 to position the leg 116 against a resting surface, as shown in FIGS. 1A, 1B, and 1C. The hinge 302 may limit the degree of downward rotation, for instance, by a spring mechanism intrinsic to the hinge 302, thereby preventing the leg 116 and thus crossbar 118 from laying against the rear housing 102 in the downward position. FIG. 3D shows a side view of the down position, whereby a minimum angle is maintained between the rear housing 102 and the leg 116 due to the limited hinge 302. The leg 116 may be maintained in the down position when magnet 120 of crossbar 118 is in sufficient proximity to rear housing magnets 104, 106, 108, or 110, for a magnetic attraction to occur. In one embodiment, at least one hinge 302 of the stand 112 provides a limited angle of rotation.

Figure 4A:
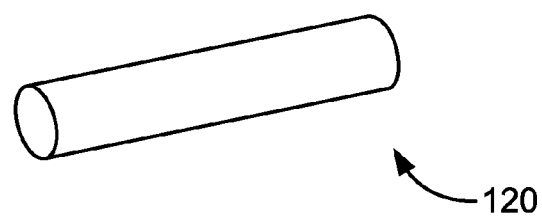
FIG. 4A shows one embodiment of a magnet.

FIG. 4A shows a possible embodiment of a magnet 120 that is configured to be embedded in the crossbar 118. The magnet 120 may be cylindrical, cubical, or any desired shape that is amenable to being embedded into, inserted through, and/or affixed to the crossbar 118.

Figure 4B:
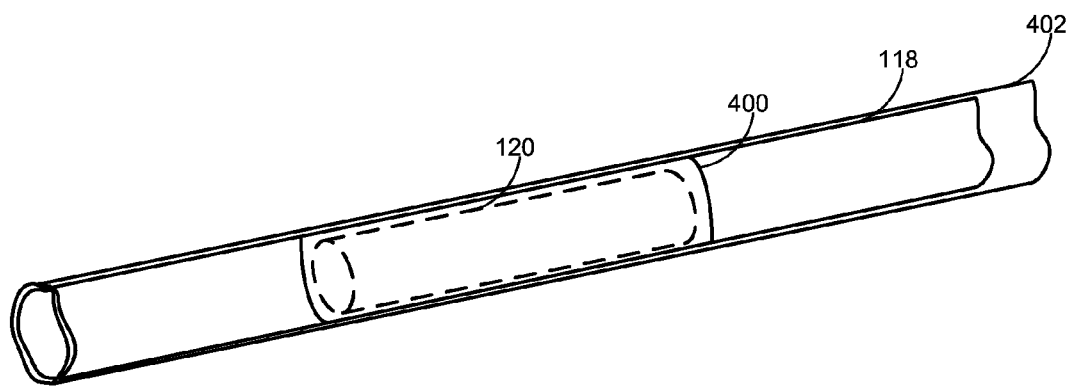
FIG. 4B shows a magnet embedded in a crossbar.

FIG. 4B illustrates the magnet 120 embedded into the crossbar 118. The crossbar 118 may comprise non-magnetic material and provide a pocket 400, such as a gap or cutout in the shape of the magnet 120, to snugly receive the magnet 120. In one embodiment, a plurality of pockets 400 may be cut into the crossbar 118 to receive a plurality of magnets 120. In another embodiment, the crossbar 118 may be hollow, and a magnet 120 may be inserted within the hollow structure. In some embodiments, the crossbar 118 may be partially or completely over moulded, for example with an elastomeric layer, such as rubber, silicone, gel, polyurethane or PVC. The elastomer over moulding may cover the magnet 120, or expose at least a portion of the magnet 120, and/or the crossbar 118, with a cut-out section. For instance, and merely by way of example, the magnet 120 may be exposed on the surface that is configured to interact with rear housing magnets when the stand is disposed in a downward position, whereas the opposite surface that is configured to be disposed flush against the tablet 100 in the up position may be over moulded as a cushion between the magnet 120 and the rear housing 102 of the tablet. The over moulding on the crossbar 118 may provide a high coefficient of friction, thereby providing grip, when deployed, against a surface on which the tablet 100 is placed.

Figure 5:
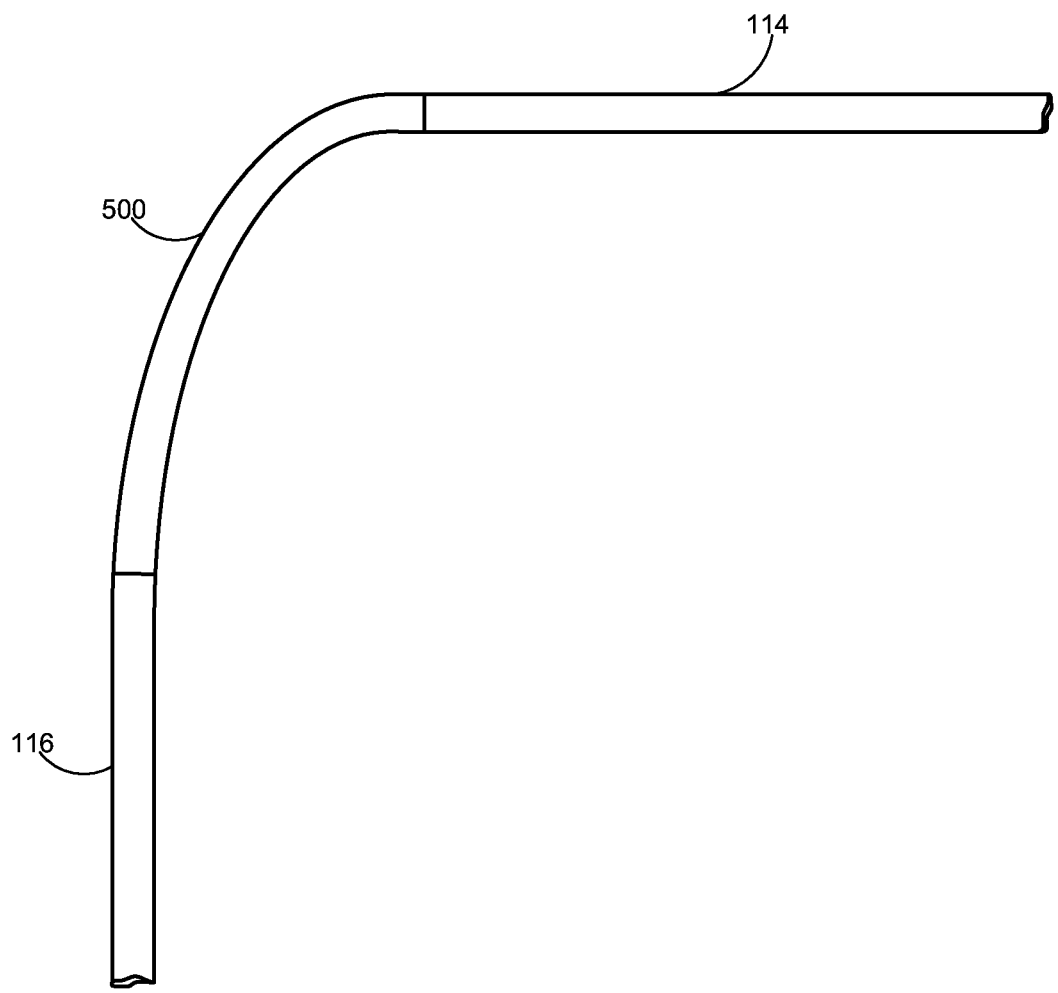
FIG. 5 shows one embodiment of a flexible joint between a crossbar and a leg.

Optionally, some embodiments might feature flexible stands, to allow for different configurations (e.g., portrait and landscape), as described above. Merely by way of example, FIG. 5 illustrates one embodiment of a flexible joint between the crossbar 118 and a leg 116. In one embodiment, the joint 500 may be manufactured with the same cut of material as crossbar 118 and leg 116, such that the joint 500, crossbar 118, and leg 116 form a single, integrated piece. In another embodiment, the joint 500 may be flexible and comprise material with elastomeric properties, such as flexible tubing, whereby each end of the tubing may be configured to receive one end of the leg 116 and one end of the crossbar 118. The joint 500 may further comprise gooseneck piping that is attached at either end to the crossbar 118 and leg 116. In another embodiment, the leg 116, crossbar 118, and/or joint 500 may comprise non-magnetic materials.

Figure 6:
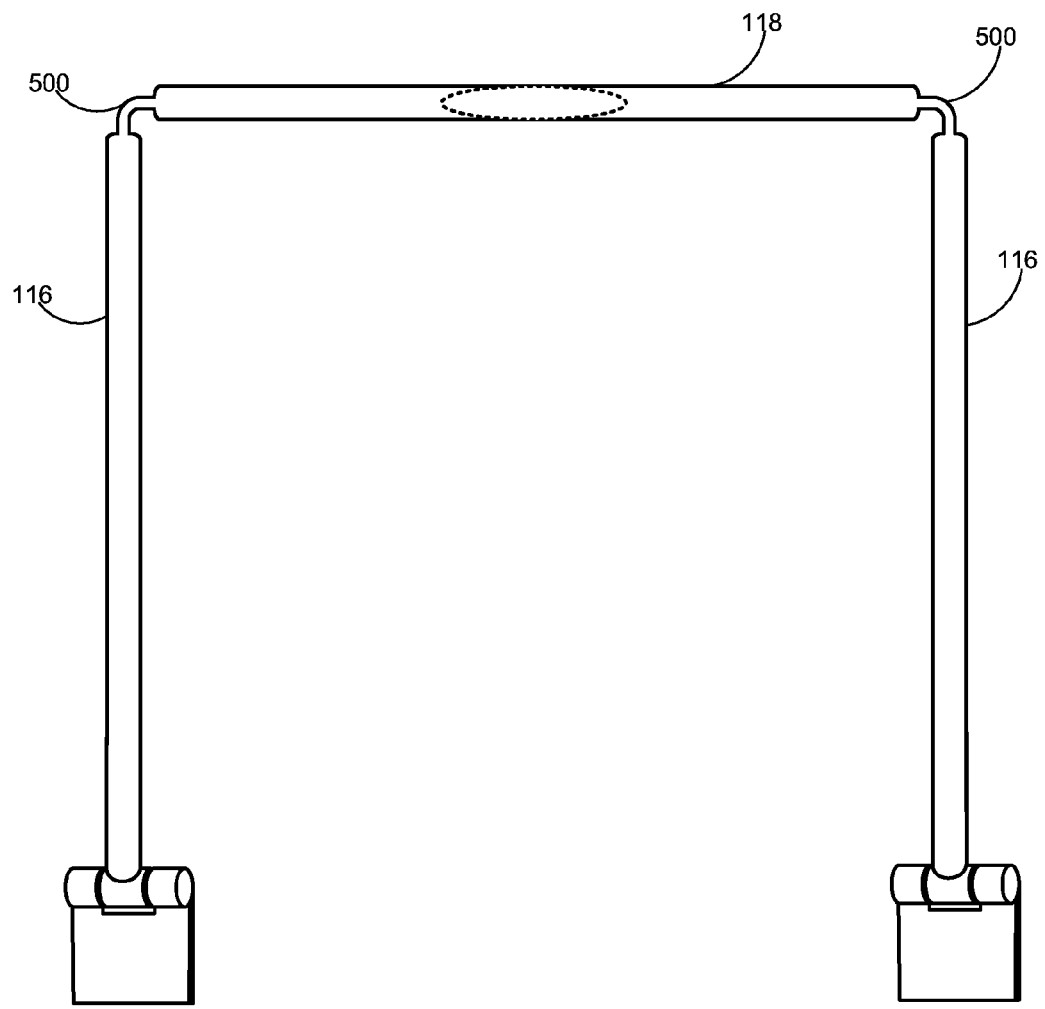
FIG. 6 shows one embodiment of an integrated magnetic tablet stand having elastomer joints.

Alternatively and/or additionally, the joint 500 can be formed from over moulded elastomer, which might be an extension of the over moulding that encompasses the magnet 120, as described above. FIG. 6 illustrates one embodiment of the integrated magnetic stand 112, in which the joints 500 comprise an elastomeric over moulding, such as rubber or silicon. As shown, the crossbar 118 and legs 116 may be over moulded, and operatively connected together by the over moulding material at joints 500. In another embodiment, the crossbar 118 and/or legs 116 may be partially over moulded, such as at ends connecting to joints 500.

Figure 7A:
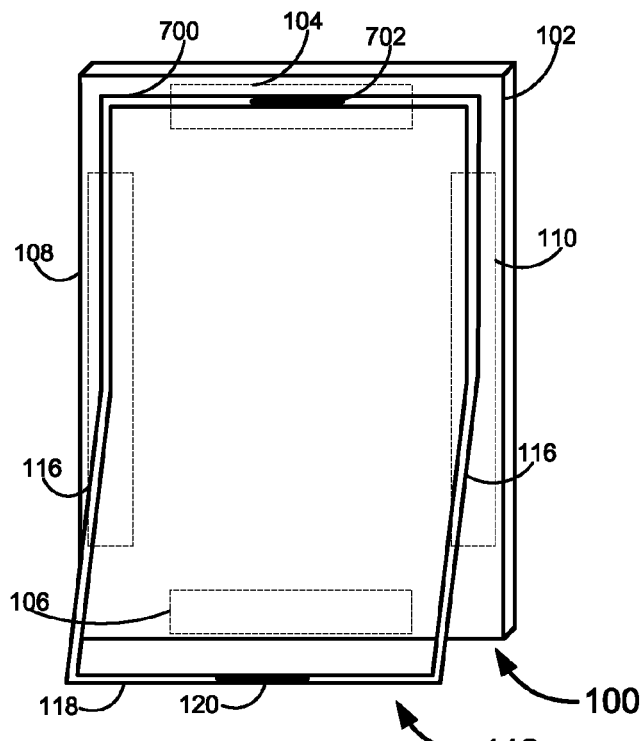
FIG. 7A shows an embodiment of an integrated magnetic tablet stand having a second crossbar.
Figure 7B:
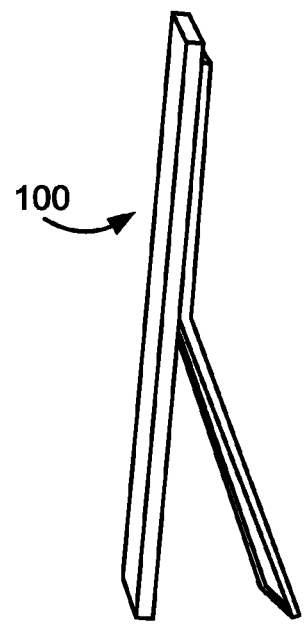
FIG. 7B shows a side view of the embodiment of FIG. 7A.

Various configurations of the stand 112 are possible. For example, while FIGS. 1 and 2 illustrate a stand 112 that can be attached to the approximate midline of the tablet housing 102 (when in portrait orientation) and can be configured for landscape viewing as well, other configurations of the stand might be dedicated for use in portrait orientation and/or might attach to the housing 112 at locations other than the midline. Merely by way of example, FIG. 7A illustrates another embodiment of an integrated magnetic tablet stand 112 as deployed on the tablet 100. The stand 112 may comprise a pair of legs 116 which are connected to crossbar 118 at the first end portion of the stand, and to an additional crossbar 700 at the second end portion of the stand opposite the first end portion. The additional crossbar 700 may have attached thereto or incorporated therein an additional magnet 702, configured to interact magnetically with a magnet 104 incorporated in or attached to the tablet 100. The connection between the pair of legs 116 and crossbars 118, 700 may be permanent, and/or manufactured from a single cut of material. The legs 116 may be permanently bent such that with the stand 112 deployed on the tablet 100, one end of the legs 116 and their connected crossbar 118 or 700 may protrude away from the tablet. As shown in FIG. 7A, the additional crossbar 700 and a top portion of legs 116 may be disposed flush against magnets 104, 108, and 110 of the rear housing 102, due to attraction of the additional magnet 702 to magnet 104. The lower crossbar 120 may be disposed away from rear housing 102 and attracted to magnet 106, thus serving as a magnetic detent to affix the tablet 100 in the upright, portrait viewing position. FIG. 7B shows a side view of the stand 112 in FIG. 7A. Merely by way of example, the legs 116 may bend at approximately a 30 degree angle away from tablet 100.

Figure 7C:
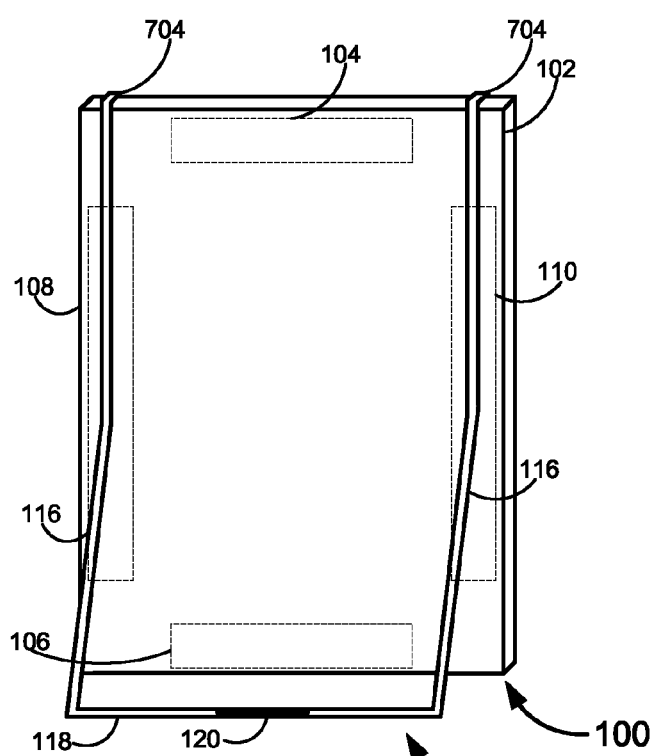
FIG. 7C shows an embodiment of an integrated magnetic tablet stand having clasps.
Figure 7D:
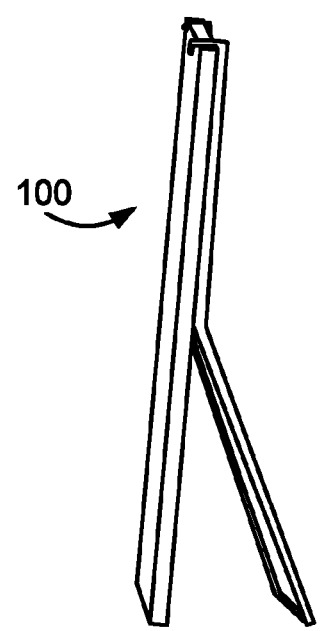
FIG. 7D shows a side view of the embodiment of FIG. 7C.

FIG. 7C shows an embodiment of the stand 112 comprising bent legs 116 with each leg 116 providing a clasp 704 configured to removably grip and receive the tablet 100. The clasps 704 may comprise similar materials of legs 116 and over moulded with a layer elastomer and/or plastics. FIG. 7D illustrates a side view of the stand 112 comprising clasps 704 that receive a top portion of tablet 100 in a portrait mode.

Figure 8A:
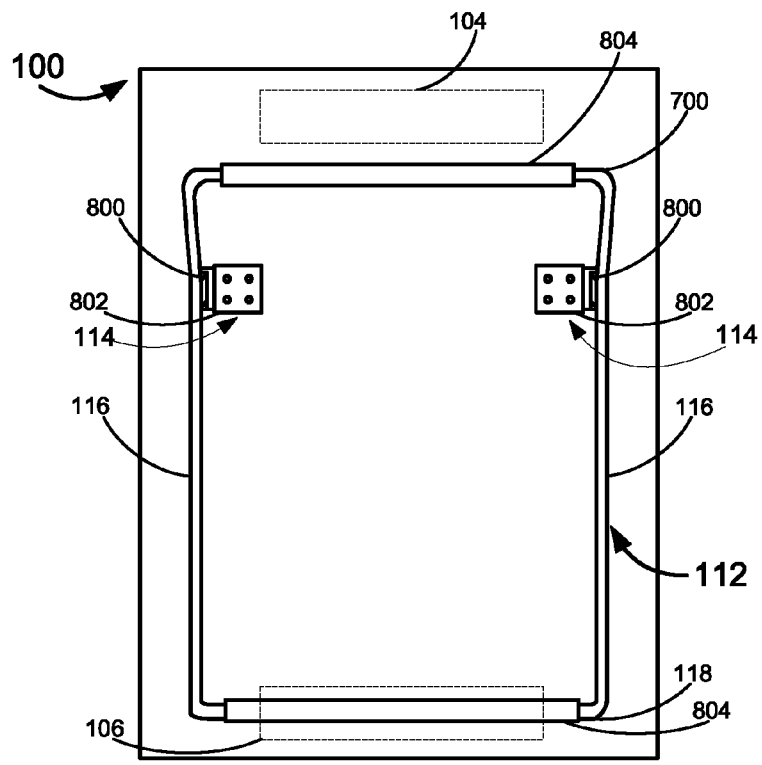
FIG. 8A shows a back view of one embodiment of an integrated magnetic tablet stand mechanically and magnetically secured to the tablet.
Figure 8B:
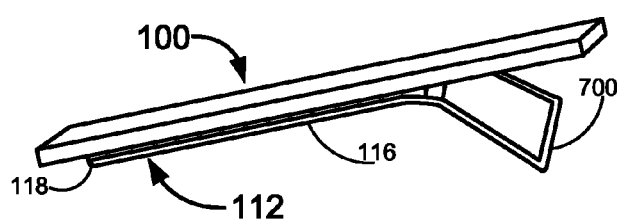
FIG. 8B shows a side angled view of the embodiment of FIG. 8A.
Figure 8C:
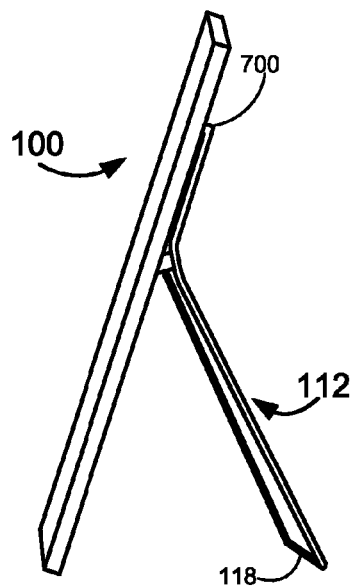
FIG. 8C shows a side view of the embodiment of FIGS. 8A and 8B in the upright viewing position.

FIGS. 8A, 8B, and 8C illustrate an alternative embodiment of the magnetic tablet stand 112 deployed on the rear housing 102 that utilizes only the upper and lower magnets 104 and 106 (in which case, unnecessary magnets can be omitted). As illustrated by the back view of FIG. 8A, the integrated magnetic tablet stand 112 may be mechanically secured to the rear housing 102 with the pair of attachment mechanisms 114. Each attachment mechanism 114 may include a hinge 800 that is attached to the leg 116 and operatively engaged to a hinge receiver 802 that may be screwed to the rear housing 102 and/or otherwise integrated with the rear housing 102, the frame of the tablet 100, or any other suitable structure. The hinge receiver 802 of the attachment mechanism 114 might define an axis of rotation for the hinge 800 at one portion, and/or holes for receiving screws for attachment to the rear housing 102 at another portion. The hinges 800 may be permanently secured to the bent legs 116 at or near a bending point of the legs 116, and/or the bending point may be off-centered such that each bent leg 116 can be defined by a shorter segment connected to the additional crossbar 700, and a longer segment connected to the crossbar 118. Crossbar 118 and/or additional crossbar 700 may be enclosed by an over moulding 804.

In another aspect, the hinges 800 may be configured to allow rotation between two opposing positions, such that rotating the hinge 800 about the axis of rotation provided in attachment mechanism 114 in one direction secures the crossbar 118 to magnet 106, and rotating the hinge 800 in the opposite direction secures the additional crossbar 700 into a magnetic attraction with the magnet 104. For instance, FIG. 8B illustrates a side angled perspective of the crossbar 118 in magnetic attraction with magnet 106, whereby the longer segment of leg 116 is disposed substantially flush against the tablet 100, and the shorter segment protrudes away from the tablet 100. The angle of protrusion and/or the length of the leg can be selected to provide a desired orientation of the tablet. For example, in this position, the bent stand 112 may maintain the tablet 100 in a relatively flat position in which both the crossbar 118 and additional crossbar 700 abut a resting surface, such that the tablet 100 may provide easy keyboard typing. FIG. 8B illustrates a side perspective of the tablet 100 in an upright angle as maintained by the stand 112 described in FIGS. 8A and 8B. The additional crossbar 700 is magnetically attracted to magnet 104 of the tablet 100, such that the crossbar 118 protrudes out and abuts the resting surface.

The integrated magnetic tablet stand 112 disclosed herein may be deployed on a plurality of different surfaces, including hard, soft, angled, and textured surfaces. By utilizing magnetics, the stand 112 may provide a user with quick on and off mounting, as well as viewing versatility with the flexible joints 500 and other embodiments. For instance, the stand 112 may provide a first desired position of the tablet 100 that is substantially upright relative to a surface on which the tablet computing system is placed, and a second desired position that is substantially prone relative to the resting surface. The stand 112 may be applicable for mounting to a tablet 100, and/or other electronic devices such as a smart phone.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A stand for a tablet computing system, the stand comprising:
   a body portion comprising one or more attachment mechanisms at a first location and a first crossbar at a second location, the first crossbar comprising a first portion of a first material that, when located in close proximity to the tablet computing system, interacts magnetically with a first portion of a second material comprised within the tablet computing system to serve as a detent that movably affixes the stand in a desired position relative to the tablet computing system,
   wherein the second location is a first end portion of the stand, and wherein the body portion of the stand further comprises a second crossbar at a second end portion of the stand opposite the first end portion of the stand, the second crossbar comprising a second portion of the first material that, when located in close proximity to the tablet computing system, interacts magnetically with a second portion of the second material comprised within the tablet computing system to serve as a second detent that movably affixes the stand in a second desired position relative to the tablet computing system.

2. The stand of claim 1, wherein the first location is a first end portion of the stand and the second location is a second end portion of the stand.

3. The stand of claim 1, wherein the second material comprises a magnet, and wherein the first material is a material magnetically attracted to the magnet.

4. The stand of claim 1, wherein at least one of the one or more attachment mechanisms comprises a hinge.

5. The stand of claim 1, wherein the at least one of the one or more attachment mechanisms engages at least one portion of the back side of the tablet computing system.

6. The stand of claim 1, further comprising two legs, each leg having a first portion connected to each end of the first crossbar and a second portion comprising one of the one or more attachment mechanisms.

7. A tablet computing system, comprising:
   a stand comprising a first end portion and a second end portion, the first end portion comprising a first crossbar comprising a first portion of a first material, the second end portion comprising a second crossbar comprising a second portion of the first material; and
   a rear housing comprising a first portion of a second material and a second portion of the second material, the first portion of the second material, when in close proximity to the first crossbar, interacts magnetically with the first portion of the first material to serve as a first detent to movably affix the stand in a first position relative the rear housing, the second portion of the second material, when in close proximity to the second crossbar, interacts magnetically with the second portion of the first material to serve as a second detent to movably affix the stand in a second position relative the rear housing.

8. The tablet computing system of claim 7, the rear housing having affixed thereto or incorporated therein second material at least along a portion of a perimeter of the rear housing.

9. A method of positioning a tablet computing system comprising a stand and a rear housing, the stand comprising a first end portion and a second end portion, the first end portion comprising a first crossbar comprising a first portion of a first material, the second end portion comprising a second crossbar comprising a second portion of the first material, and the rear housing comprising a first portion of a second material and a second portion of the second material, the first portion of the second material, when in close proximity to the first crossbar, interacts magnetically with the first portion of the first material to serve as a first detent to movably affix the stand in a first position, the second portion of the second material, when in close proximity to the second crossbar, interacts magnetically with the second portion of the first material to serve as a second detent to movably affix the stand in a second position, the method comprising:
   moving the stand until the first portion of the second material interacts materially with the first portion of the first material, movably affixing the stand at the first detent; and
   placing the tablet computing system on a flat surface, so that the stand serves as a support to maintain the tablet in a generally upright position.

* * * * *